US012441074B2

(12) United States Patent
Hejplik et al.

(10) Patent No.: US 12,441,074 B2
(45) Date of Patent: Oct. 14, 2025

(54) RADIAL PRESS

(71) Applicant: Uniflex-Hydraulik GmbH, Karben (DE)

(72) Inventors: Vaclav Hejplik, Dietzenbach (DE); Reiner Viehl, Frankfurt (DE); Carsten Baumgartner, Laubach (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 399 days.

(21) Appl. No.: 18/079,601

(22) Filed: Dec. 12, 2022

(65) Prior Publication Data

US 2023/0116737 A1 Apr. 13, 2023

Related U.S. Application Data

(63) Continuation of application No. PCT/EP2021/071137, filed on Jul. 28, 2021.

(30) Foreign Application Priority Data

Aug. 11, 2020 (DE) ......................... 102020121143.0

(51) Int. Cl.

*B30B 7/04* (2006.01)
*B30B 1/00* (2006.01)
(Continued)

(52) U.S. Cl.

CPC ................ *B30B 7/04* (2013.01); *B30B 1/007* (2013.01); *B30B 15/041* (2013.01); *B30B 15/062* (2013.01); *B30B 15/068* (2013.01)

(58) Field of Classification Search

CPC ......... B30B 7/04; B30B 1/007; B30B 15/041; B30B 15/062; B30B 15/068; B30B 1/40;
(Continued)

(56) References Cited

U.S. PATENT DOCUMENTS 4,155,300 A 5/1979 Baltschun
4,550,587 A 11/1985 Eisenzimmer
(Continued)

FOREIGN PATENT DOCUMENTS

DE 3512241 A1 10/1986
DE 3611253 C2 3/1989
(Continued)

OTHER PUBLICATIONS

International Search Report issued by The European Patent Office for International Patent Application No. PCT/EP/2021/071137, mailed on Nov. 8, 2021.

*Primary Examiner* — Christopher L Templeton
(74) *Attorney, Agent, or Firm* — Myers Wolin, LLC

(57) ABSTRACT

A radial press is provided having a first and a second ring structure which extend around a press axis and a plurality of pressing elements, which are disposed around the press axis and are translatably supported on supporting surfaces associated with the ring structures. The axial distance of the two ring structures from each other can be changed using a hydraulic drive system, which has a plurality of hydraulic cylinder-piston units oriented parallel to and distributed around the press axis, the cylinder of each cylinder-piston unit being coupled to a first of the two ring structures and the piston rod of each cylinder-piston unit being coupled to the second ring structure. At least the supporting surfaces associated with one of the two ring structures are oriented at an inclination with respect to the press axis. An electromechanical rapid adjustment drive comprising a plurality of adjusters is also provided.

18 Claims, 5 Drawing Sheets

(51) Int. Cl.
*B30B 15/04* (2006.01)
*B30B 15/06* (2006.01)

(58) Field of Classification Search
CPC ..... B30B 15/04; B30B 15/0052; B21D 39/04; B21D 39/046; B21D 39/048; B21J 13/025; B25B 27/10
USPC .......................................................... 100/232
See application file for complete search history.

(56) References Cited

U.S. PATENT DOCUMENTS

| | | | |
|---|---|---|---|
| 4,766,808 | A | 8/1988 | Schroeck |
| 4,873,912 | A | 10/1989 | Schulze |
| 2014/0331734 | A1 | 11/2014 | Van Essen |

FOREIGN PATENT DOCUMENTS

| | | | |
|---|---|---|---|
| DE | 29824688 | U1 | 8/2002 |
| DE | 10149924 | A1 | 4/2003 |
| DE | 102005041487 | A1 | 4/2007 |
| FR | 2341093 | A1 | 9/1977 |

RADIAL PRESS

CROSS REFERENCE TO RELATED APPLICATIONS

This application is a continuation under 35 U.S.C. § 120 of International Application PCT/EP2021/071137, filed Jul. 28, 2021, which claims priority to German Application No. 102020121143.0, filed Aug. 11, 2020, the contents of each of which are incorporated by reference herein.

FIELD OF THE INVENTION

The present invention relates to a radial press with a first and a second ring structure extending around a press axis and, disposed between them around the press axis, several pressing elements displaceably braced at bracing faces associated with the ring structures, wherein the axial distance of the two ring structures from one another can be varied by means of a hydraulic drive system, which comprises a multiplicity of hydraulic cylinder-piston units oriented parallel to the press axis and disposed in distributed manner around it, of which respectively the cylinders are coupled with a first of the two ring structures and the piston rods are coupled with the second ring structure, and wherein furthermore at least the bracing faces associated with one of the two ring structures are oriented at an inclination to the press axis.

BACKGROUND

Radial presses of the generic type mentioned in the foregoing are known in various configurations (see, for example, DE 35 12 241 A1, U.S. Pat. No. 4,550,587 A, FR 2 341 093 A1, US 2014/0331734 and DE 36 11 253 C2) and are being used (for example in the form of the "HM 200" radial press of Uniflex Hydraulik GmbH, Karben). They are both compact and powerful and are characterized by several construction-related advantages-especially compared with those of yoke-press design (see, for example, the "HM 325" radial press of Uniflex Hydraulik GmbH, Karben). They include in particular the fact that the press axis is not displaced during the pressing process, which is essential in particular for automatic charging. A further advantage is the flexibility with respect to the number of pressing elements; if necessary, these may even be provided in an odd number.

In the interests of high fabrication efficiency, it is important that the pressing elements be moved rapidly toward the workpiece to be pressed at the beginning of the respective press cycle, before the (slow) power-pressing then begins. In this regard, substantially two concepts are known: Either the drive system comprises, in addition to the hydraulic cylinder-piston units that bring about (power) pressing, at least one further hydraulic cylinder-piston unit having a working chamber provided with a smaller active area, wherein its pressurization by the hydraulic pump of the drive system causes rapid positioning of the two ring structures, wherein, during this rapid positioning, the hydraulic cylinder-piston units serving the power pressing are moved passively and during operation by make-up suction are fed from the tank (see, for example, DE 101 49 924 A1 concerning a non-generic radial press of the hollow-piston type). Or else (see FIG. 1 of DE 35 12 241 A1), the geometry of the bracing faces, having an inclination relative to the press axis, of the at least one ring structure and the mating faces of the pressing elements sliding on these is of stepped construction, so that two different step-up ratios are obtained between the relative movement of the two ring structures relative to one another and the radial movement of the pressing elements.

Generic radial presses corresponding to the prior art have absolutely proved their worth for the fabrication of conventional workpieces by deforming them radially. In practice, however, the constructive concepts in question are limited only to such radial presses that are used for the forming of particularly large workpieces (e.g. diameters greater than 500 mm) or that are designed for radial deformation with particularly high pressing force (e.g. greater than 5,000 kN).

SUMMARY

The present invention has an object of providing a radial press of the generic type, which is suitable for forming particularly large workpieces under practical conditions, namely accomplished with particularly high pressing force, and is superior in such an application to the prior art.

According to the invention, this stated object may be accomplished by the fact that an electromechanical rapid positioning drive comprising several positioners acting functionally in parallel with one another and coordinated with one another is provided. By implementation of the present invention, i.e. by implementation of such an electromechanical rapid positioning drive, which comprises several positioners-acting functionally in parallel with one another and coordinated with one another—by means of which the axial spacing present between the two ring structures is possible without use of hydraulic components, especially without active pressurization of the hydraulic cylinder-piston units, a series of serious advantages is achieved surprisingly simply, especially for the application situation of interest here. Thus, in contrast to the case of radial presses in which the bracing and mating faces have geometry of stepped construction (see above), a largest possible area of contact is available for power-pressing. Accordingly, the high pressing forces desired here between the bracing faces and the associated mating faces can be achieved with acceptable pressures per unit area, which is important from viewpoints of useful life of the radial press, among other reasons. In addition, again in contrast to the case of radial presses in which the bracing and mating faces have geometry of stepped construction (see above), the transition from closing the die in rapid mode to power-pressing adapted to the respective workpiece can be freely adjusted. This permits optimized process workflows, which are favorable for efficiency.

Precisely from viewpoints of efficiency, radial presses according to this disclosure are also superior to those in which the drive system comprises, in addition to the hydraulic cylinder-piston units that bring about (power-) pressing, at least one further hydraulic cylinder-piston unit (see above)—bringing about the rapid positioning. This is so because an electromechanical rapid positioning drive used according to the disclosure and comprising several positioners-acting functionally in parallel with one another and coordinated with one another—is characterized by particularly high possible reaction capability; it is able to react much faster to process-internal conditions than a hydraulic rapid drive. Thus the disclosed construction of the radial press makes it possible in particular to suddenly stop the movement of the two ring structures toward one another in rapid mode if, for example, one of the pressing elements comes into contact with the workpiece. Compared with generic radial presses having a hydraulic rapid drive, closing of the die in rapid mode can take place with a higher speed (higher dynamic response) and closer to the workpiece, without jeopardizing the integrity of the respective workpiece, thus permitting an efficiency-improving shortening of the cycle times.

According to a first preferred further development of the invention, the cylinder-piston units of the cylinder-piston units are constructed as synchronous cylinders. This may contribute, again in entirely surprising manner, to substantially further improved advantageous properties of the radial press, namely to a further increased dynamic response. This is so because, due to their construction as synchronous cylinders, the cylinder-piston units of the drive unit are volume-neutral in rapid mode; no volume difference has to be injected from the tank. Consequently, “refilling” of hydraulic fluid within the respective cylinder-piston unit from one working chamber to the other is able to take place in the rapid mode alone. Make-up suction of hydraulic fluid from the tank can be omitted. In turn, even at high volume flows such as are unavoidable in heavy-duty radial presses because of the large active areas of the cylinder-piston units, therefore, no danger exists that the hydraulic fluid will foam up. Thus a particularly high positioning dynamic response is possible in rapid mode, and problems caused by foaming (e.g. concerning fabrication accuracy) do not occur.

It is particularly advantageous in the foregoing context when a valve unit permitting a direct hydraulic short circuit of the two working chambers of the synchronous cylinder in question is then associated with each synchronous cylinder. Thus the refilling of hydraulic fluid within the respective cylinder-piston unit from one working chamber into the other takes place on the shortest possible path. Thus losses can be minimized, because it is possible to work with relatively large flow cross sections. It is quite particularly favorable when the valve units are disposed respectively at the end of the associated piston rod, which is provided with supply ducts. Thus no pipework is needed.

Another preferred further development of the invention is characterized in that the rapid positioning drive comprises a common servo motor acting on all positioners. Here, coordination as it were of the positioners takes place mechanically, by the fact that distribution gear mechanisms are provided in the drive train from the common servo motor to the multiplicity of positioners connected thereto. The compulsory coupling of the positioners provided in this way not only is advantageous to the achievable fabrication precision; for its part, it also favors a particularly high permissible dynamic response in rapid mode.

In yet another preferred further development of the invention, the rapid positioning drive comprises a self-locking gear mechanism. Such self-locking in the drive chain between the (common) servo motor and the positioners is of great benefit in the assembly of the radial press as well as in the performance of maintenance tasks and, in fact, especially in an upright design of the radial press, i.e. vertically oriented press axis. In connection with this, it is further advantageous when a separating clutch, preferably an electromechanical separating clutch, is provided in the drive train of the rapid positioning drive, and/or when the drive train of the rapid positioning drive is provided with an input used for manual actuation.

Yet another preferred further development of the invention is characterized in that the positioners are not connected directly with the two ring structures but instead act respectively between the cylinder and the piston rod of a hydraulic cylinder-piston unit. Thus the number of force-transmitting links from drive components to the ring structures can be minimized. The optimal integrity of the ring structures favors their shape stability even under the highest loads and thus the avoidance of unnecessarily large masses.

According to yet another preferred further development of the invention, the pressing elements comprise base jaws and pressing jaws that can be fastened exchangeably to these. In particular, a hydraulically actuatable interlocking system can then act between the base jaws and the pressing jaws. This is beneficial in large presses, where minimal retrofitting times can be achieved by automatic change of the pressing jaws.

Further above, mention was already made of the advantageous option wherein the press axis is vertically oriented, so that one of the ring structures forms a lower ring structure and the other ring structure forms an upper ring structure. Preferably, the lower ring structure is braced via a load-bearing structure on the foundation but is spaced apart from it. Thus a space into which a correspondingly large workpiece to be pressed can extend is formed underneath the lower ring structure. It is further particularly favorable in such upright radial presses when the upper ring structure is braced on the lower ring structure at least in the scope of a substantial part of its own mass as well as of that of the elements, associated with it, of the hydraulic cylinder-piston units via spring elements (e.g. gas struts). Ideally, the unit comprising the upper ring structure and the elements of the hydraulic cylinder-piston units associated therewith is then more or less balanced via the spring elements, so that, due to the hydraulic drive system and/or the rapid positioning drive, the forces to be provided for opening the die are small. Just as for the positioners of the rapid positioning drive (see above), it is also the case for the spring elements explained in the foregoing that, particularly preferably, they engage not directly and immediately on the two ring structures but instead indirectly, by the fact that the spring elements act between the lower ring structure and the elements, associated with the upper ring structure, of the hydraulic cylinder-piston units.

Yet another preferred further development of the inventive radial press is characterized in that only the bracing faces associated with one of the two ring structures are inclined relative to the press axis, whereas the bracing faces associated with the other ring structure are oriented perpendicular to the press axis. In this way an axial movement of the pressing elements relative to the second-mentioned ring structure is suppressed during closing and opening of the die. If this is constructed as a stationary ring structure (e.g. as a lower ring structure, braced on the foundation, in the sense explained further above), the pressing elements also execute no kind of axial movement but exclusively a radial movement during opening and closing of the die. This is a serious advantage, precisely for radial pressing of very large component parts, which cannot be handled manually, but with which the radial press is to be charged (mechanically). In addition, the pure radial movement of the pressing elements relative to one of the two ring structures is very advantageous, because this facilitates the implementation of a displacement-measuring device acting with radially oriented measuring direction between the ring structure in question and at least one of the pressing elements; and this in turn is of great advantage for precise process control and thus for the quality of the finished workpiece.

Finally, it is particularly favorable in inventive radial presses when the pressing elements are guided compulsorily relative to the two ring structures. Compared with the prior art, wherein it is provided that the pressing elements are radially retracted outward by restoring springs during opening of the radial press, this takes place according to this further development of the invention by compulsory guidance of the pressing elements on the two ring structures; in other words, the position of the pressing elements is clearly defined here by their compulsory guidance on the two ring structures. Restoring springs acting between the pressing elements can be omitted.

Such compulsory guidance of the pressing elements that takes place on the two ring structures is also manifested in several significant advantages relevant to practice. Thus, such double, bilateral compulsory guidance of the pressing elements ensures, for example, that they will not be able to tilt-namely as a consequence of an axially acting load. The resistance of the pressing elements to tilting that can be achieved in this way makes the radial presses of such construction suitable for radial pressing of axially loaded workpieces. This is in turn a decisive aspect, namely in connection with machining of particularly large and/or heavy workpieces; this is so because, for these, radial deformation in radial presses with vertically oriented press axis, i.e. in "upright" radial presses, is advantageous, wherein the die must typically support here at least part of the weight of the workpiece while it is being pressed, which is manifested by corresponding axially acting loads. Even in radial presses with recumbent, i.e. more or less horizontally oriented press axis, however, serious advantages can be achieved by implementation of this further development of the invention, namely especially in its application for joining of component parts clamped together in axial direction, wherein at least part of the corresponding axial clamping forces is transmitted via the pressing elements into the workpiece.

By the fact that—regardless of the specific orientation of the press axis (vertical, horizontal or inclined)—the bilateral compulsory guidance of the pressing elements on the two ring structures reliably counteracts tilting of the pressing elements due to axial forces transmitted from the workpiece to the pressing elements, even workpieces with dimensions considerably smaller than the maximum size can be reliably formed with a radial press suitable for pressing large workpieces by appropriate adaptation of the pressing elements (e.g. by exchanging exchangeable pressing jaws; see below). This is so even with respect to a relatively long lever arm, due to the large radial extent of the pressing elements in question, with which the axial forces transmitted into the pressing elements act in a radial press set up for forming of workpieces with dimensions considerably smaller than the maximum size. Thus a correspondingly large tilting moment acting on the pressing elements does not have a detrimental effect. In turn, the reproducibility of pressing benefits from this, as do consequently the quality of forming and that of the finished workpiece.

Particularly pronounced effects in the foregoing respect are achieved when the extent of the pressing elements in axial direction is particularly large, for example when the extent of the pressing elements (or possibly of the base jaws guided on the ring structures, see below) parallel to the press axis is at least twice as large as transversely relative thereto.

In addition, the bilateral compulsory guidance of the pressing elements-during opening of the radial press-reliably also prevents lifting of the pressing elements toward the press axis from occurring from the bracing faces inclined relative to the press axis due to radially inwardly directed forces. Thus this further development the invention also provides a solution for the hazard—that, depending on the specific contour of the workpiece surface in the forming region and the material being used, exists in particular during forming of large workpieces—of just such forces caused by jamming of the pressing elements on the workpiece surface ("pull-out forces"), by which conventional radial presses equipped with restoring springs can be considerably damaged in the extreme case.

Furthermore, in the context of high flexibility of use (see above) of the radial press according to this further development of the invention, it turns out to be positive that limitation of the working range (i.e. of the maximum possible radial stroke of the pressing elements), such as occurs regularly in conventional radial presses due to the restoring springs (i.e. due to their working range), does not exist for it. The resetting of the pressing elements during opening of the radial press by the bilateral compulsory guidance of the pressing elements on both ring structures permits a larger working range of the radial press compared with the prior art.

In addition, the omission of the restoring springs conventionally disposed respectively between the mutually adjacent pressing elements simplifies the assembly of the radial press. And also the magnitude of the pressing force available on the workpiece benefits from the fact that closing of the die does not have to take place against the restoring force of restoring springs. Precisely in such conventionally constructed radial presses, in which tilting moments and/or pull-out forces co-acting within the spectrum of application on the pressing elements have to be taken into account (see above), the restoring springs must provide very high restoring forces. These bring about a reduction, which may be substantial, of the forming force that can be effectively applied on the workpiece.

The double, bilateral compulsory guidance, explained in the foregoing, of the pressing elements is able to take place respectively via the pressing elements and pairs, associated with the ring structure in question, of guide slots and guide elements engaging in these. It is particularly advantageous in this case when the guide slots are made in the pressing elements and/or when the guide elements comprise guide rollers.

To avoid misconceptions, it is to be remarked as a precaution that the term "ring structure" in no way implies that the structure in question is more or less round. To the contrary, the decisive feature is that the structure extends in closed manner around a central open region. For example, the outer contour of the "ring structure" in question may also approximate a polygon. Nevertheless, a contour at least very closely approaching a circular shape is still particularly advantageous, and specifically because of the distribution, approaching ideal conditions, of stresses within the ring structures and also of the methods that can be used for their fabrication.

BRIEF DESCRIPTION OF THE DRAWING

The present invention will be explained in more detail in the following on the basis of a preferred exemplary embodiment, illustrated in the drawing, wherein.

DETAILED DESCRIPTION OF THE PREFERRED EMBODIMENTS

Figure 1:
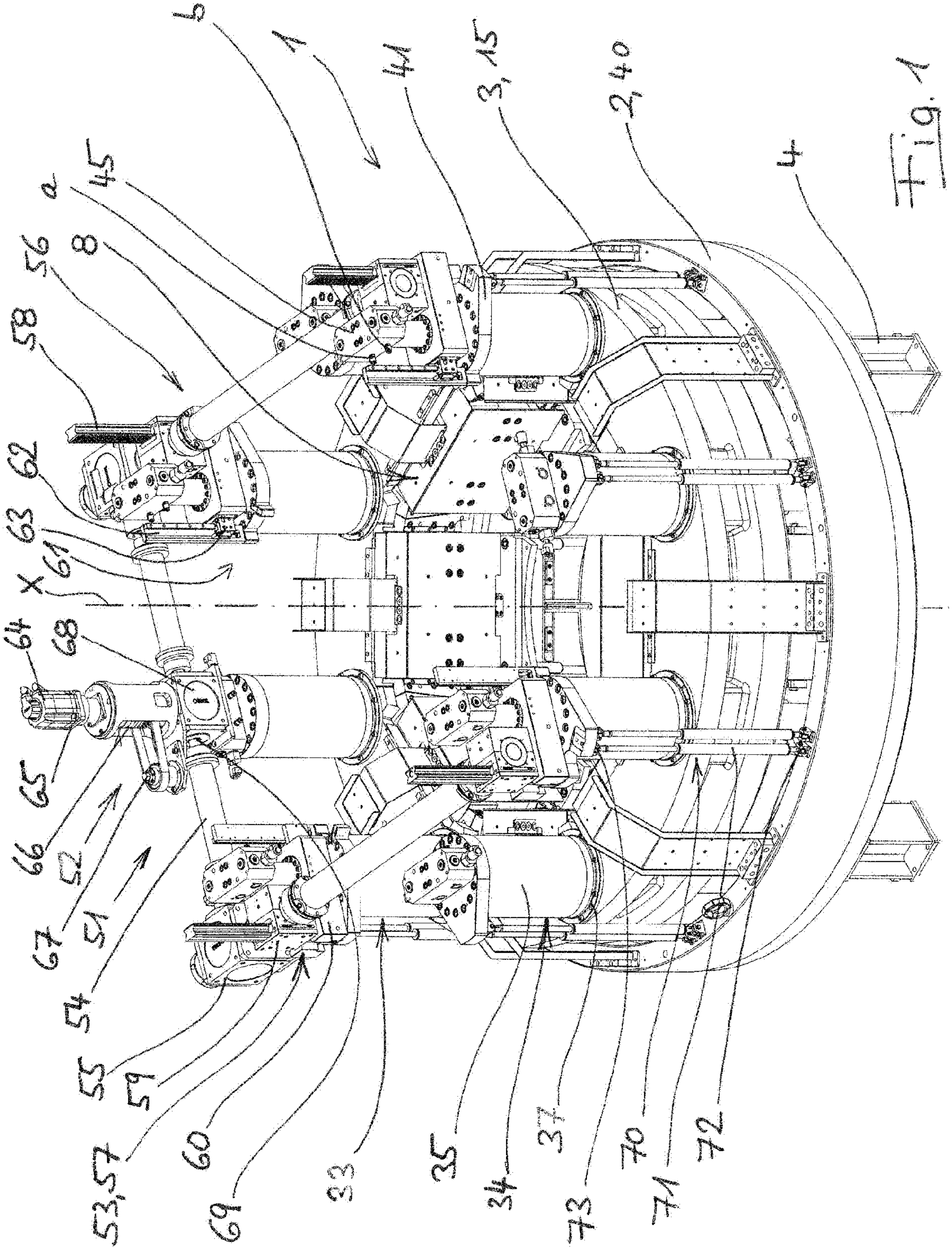
FIG. 1 shows the radial press in question in perspective view obliquely from above.
Figure 2:
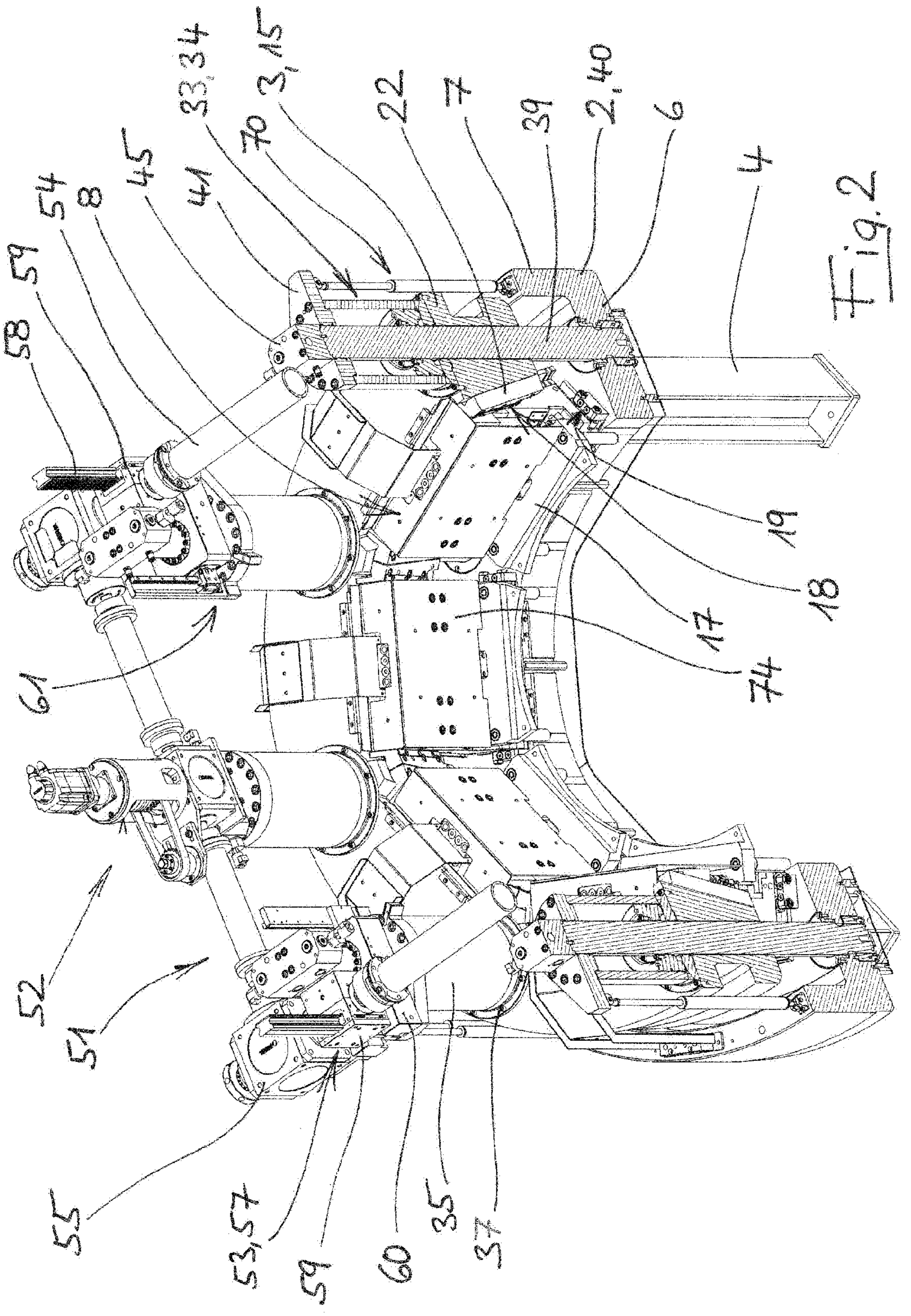
FIG. 2 shows, in an angled view similar to that of FIG. 1, the radial press shown therein in cutaway representation.
Figure 3:
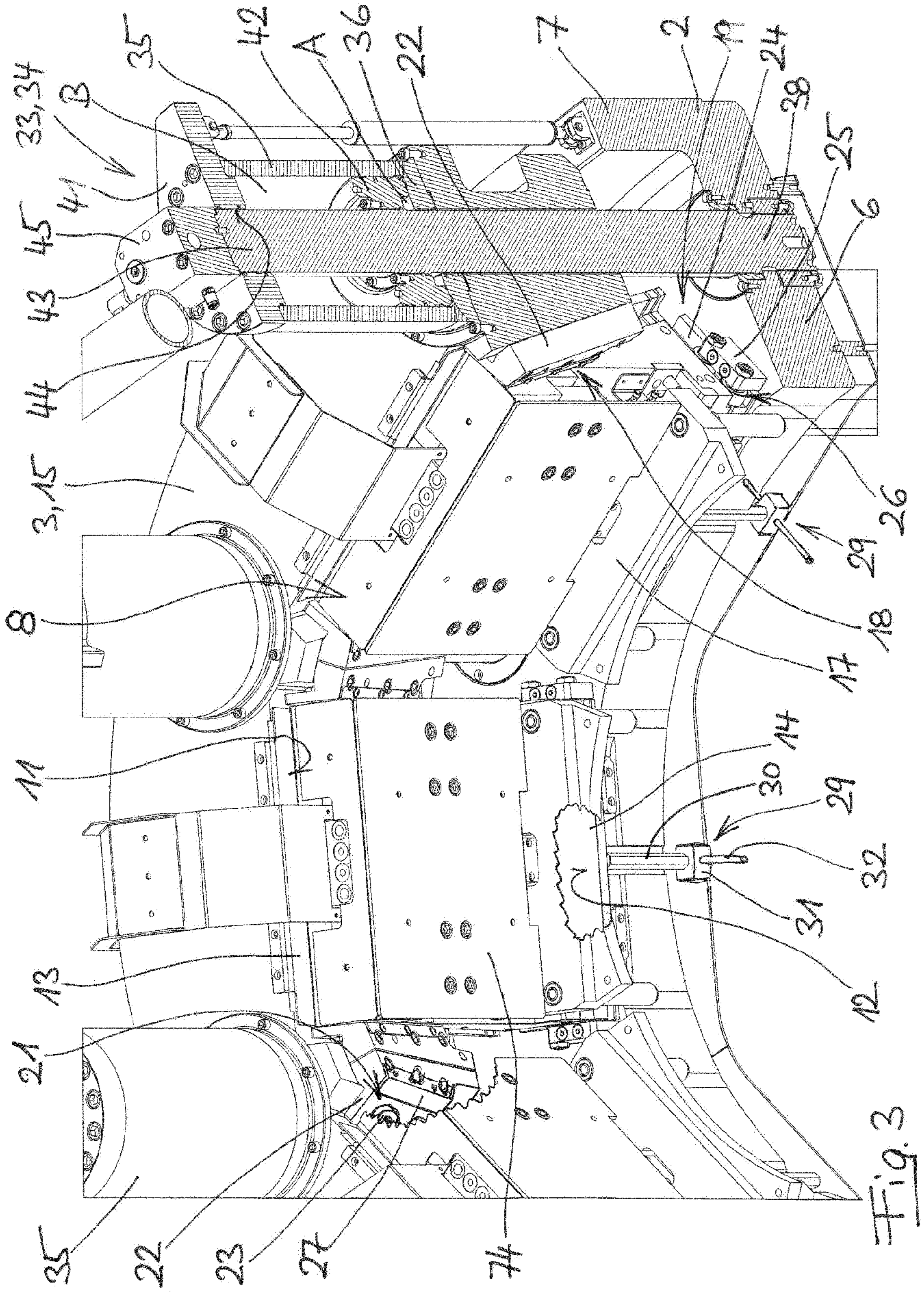
FIG. 3 shows a section from FIG. 2 on an enlarged scale.
Figure 4:
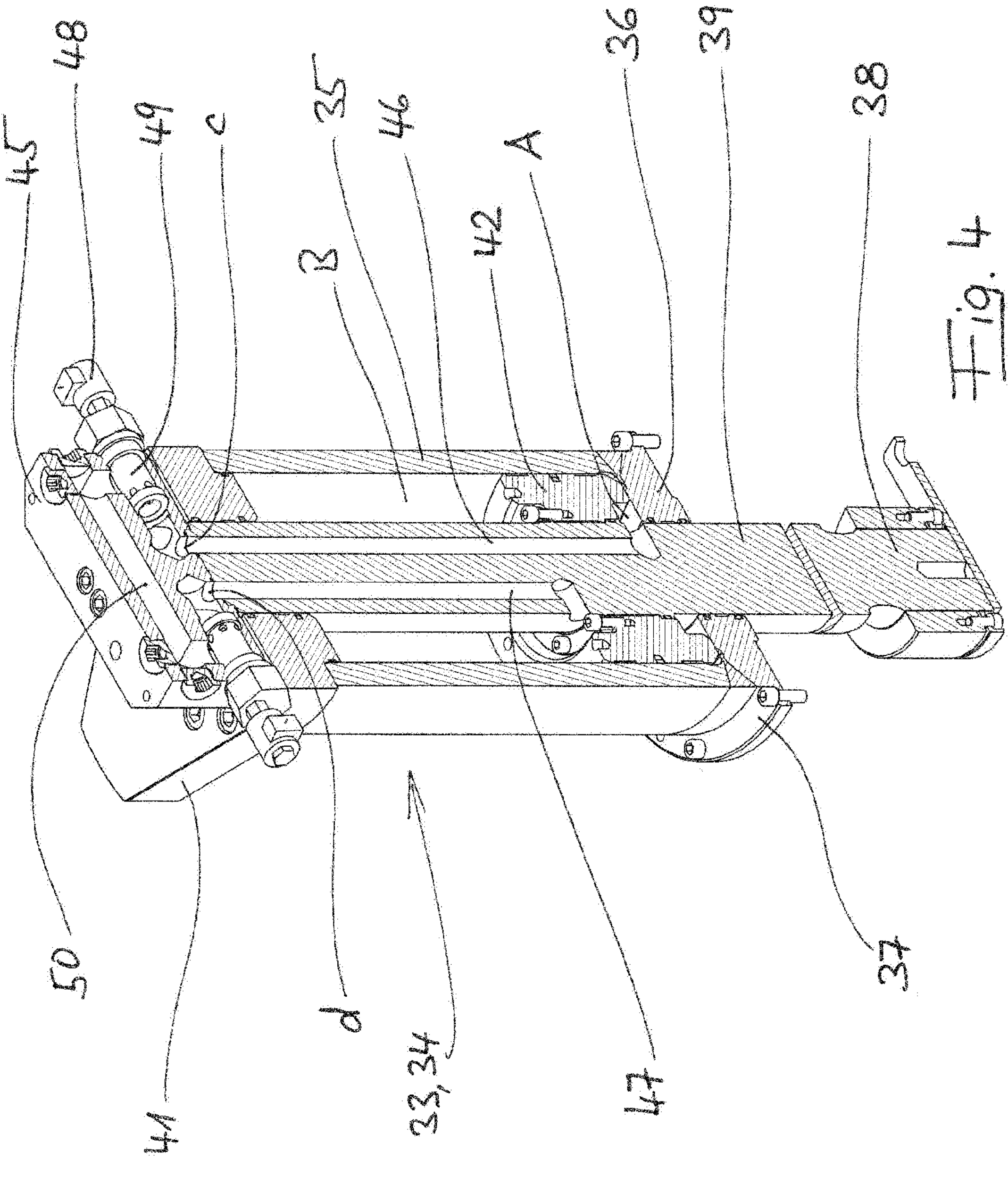
FIG. 4 shows, in perspective view obliquely from above, one of the eight hydraulic cylinder-piston units of the radial press shown in FIGS. 1-3
Figure 5:
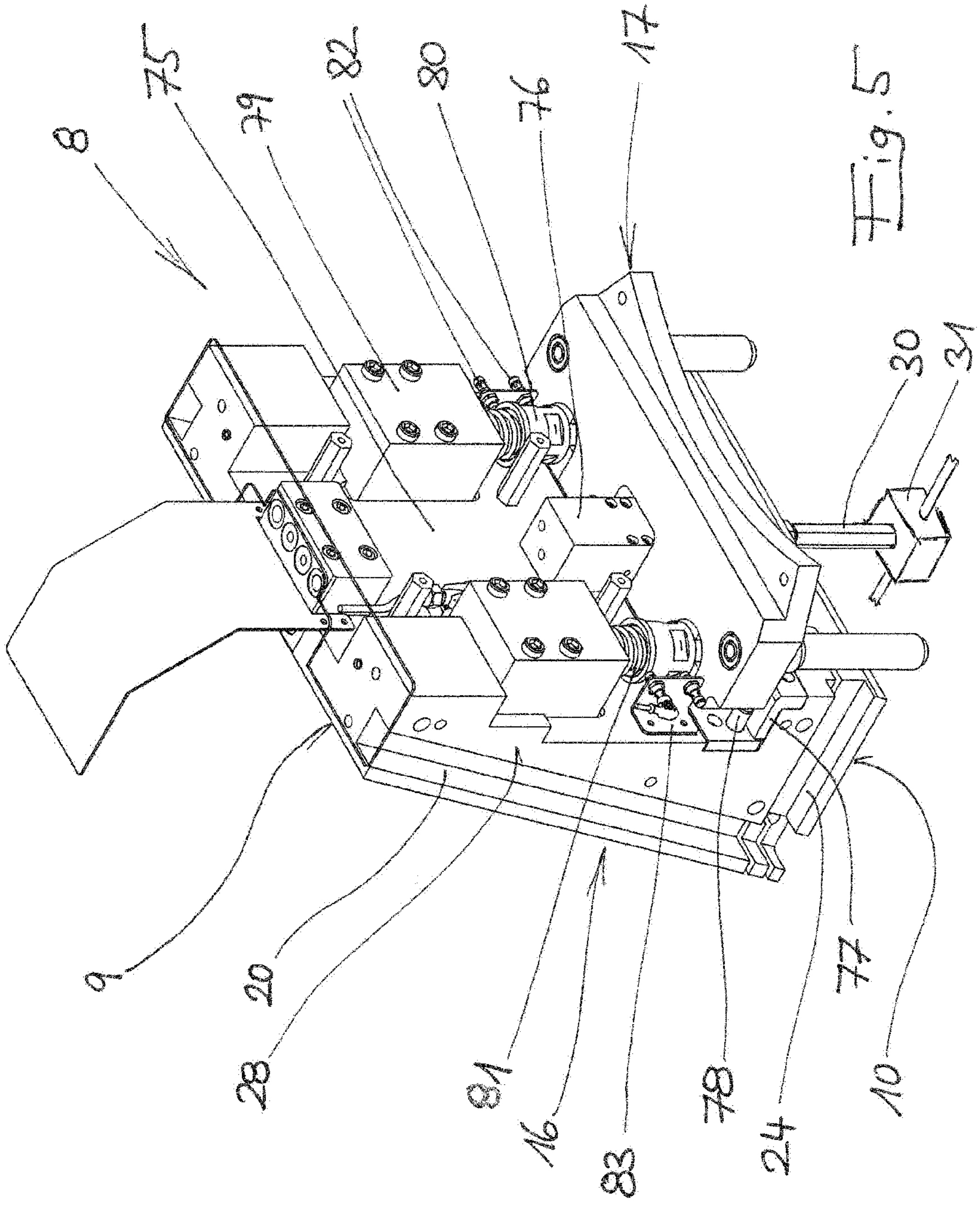
FIG. 5 shows one of the eight pressing elements of the radial press according to FIGS. 1-3 without the associated panel.

Radial press 1, illustrated in the drawing, designed for operation with vertical press axis X, comprises a first, lower ring structure 2 and a second, upper ring structure 3. Both ring structures 2, 3 extend around press axis X. This lower ring structure 2 is constructed as a stationary ring structure and is braced via beams 4 on the foundation. The second, upper ring structure 3 can be raised and lowered by means of a hydraulic drive system, i.e. the spacing of upper ring structure 3 relative to lower ring structure 2 can be decreased and increased by means of the hydraulic drive system. The lower ring structure has a pot-like basic shape (with an open region at the center!), by the fact that it has a bottom ring 6 and a substantially cylindrical wall 7 towering from it; it is so dimensioned that lowered upper ring structure 3 is inserted into lower ring structure 2 in the sense that it and cylindrical wall 7 of lower ring structure 2 overlap one another. Furthermore, the radial press comprises, disposed uniformly around press axis X, eight pressing elements 8, which—via associated upper mating faces 9 and lower mating faces 10—are respectively braced in slidingly displaceable manner on an upper plane bracing face 11 associated with upper ring structure 3 as well as on a lower plane bracing face 12 associated with lower ring structure 2. These upper bracing faces 11 are respectively constructed on the surface of an exchangeable upper sliding plate 13, and the lower bracing faces 12 are respectively constructed on the surface of an exchangeable lower sliding plate 14. Whereas lower bracing faces 12 (as well as associated lower mating faces 10) stand perpendicular to press axis X, upper bracing faces 11 (as well as associated upper mating faces 9) are oriented at an inclination to press axis X. Thus upper bracing faces 11 represent "control faces", via which an axial movement of upper ring structure 3 is transformed into a radial movement of pressing elements 8. Upper ring structure 3 thus forms a "control ring" 15.

Pressing elements 8 comprise base jaws 16, on which upper and lower mating faces 9 and 10 are constructed, and pressing jaws 17 that can be attached exchangeably to base jaws 16. Each of the base jaws 16—the extent of which parallel to press axis X is approximately twice as large as transversely relative thereto—is guided on upper ring structure 3 via an upper compulsory guide 18 and on lower ring structure 2 via a lower compulsory guide 19 in such a way that it is held (at least substantially) without clearance on the two associated bracing faces 11 and 12, i.e. it cannot be raised from them. Upper compulsory guide 18 then comprises two guide slots 20 machined laterally in base jaws 16 in question and extending parallel to upper mating face 9 and, engaging therein and disposed on upper ring structure 3, guide elements 21 in the form of roller arrangements 23 attached to an (upper) roller carrier 22. Correspondingly, lower compulsory guide 19 has its guide slots 24 and roller arrangements 26 attached to (lower) roller carriers 25. The individual rollers are then respectively mounted on a bolt constructed as a positioning cam. For guidance of base jaws 16 in circumferential direction, sliding plates 27, which respectively define a bracing face and on which base jaws 16 are braced via associated mating faces 28, are attached to upper roller carriers 22.

Respectively one displacement-measuring device 29 (with measuring direction parallel to lower compulsory guides 19, i.e. oriented radially), by means of which respectively the relative position of the base jaw 16 in question relative to lower ring structure 2 can be indicated, is associated with at least one part of pressing elements 8. Displacement-measuring device 29 in question comprises a pin 30 connected with the base jaw 16 in question and projecting downward from this with a transducer 31, which is disposed on its end and which cooperates with an associated ruler 32 fixed on lower ring structure 2 and extending radially.

The hydraulic drive system used for relative movement of the two ring structures 2 and 3 relative to one another comprises eight hydraulic cylinder-piston units 33 oriented parallel to press axis X and a pressure-supply unit (not illustrated but of customary construction) having a tank, a motor-pump unit and a controller. Hydraulic cylinder-piston units 33—respectively disposed with gaps on pressing elements 8—are constructed as synchronous cylinders 34. Via an associated flange 37 formed on cylinder bottom 36, cylinder 35 is respectively joined securely with upper ring structure 3 (control ring 15). Lower end 38 of the respective piston rod 39 extending through cylinder 35 is accordingly joined securely with lower ring structure 2 ("bracing ring" 40).

Two hydraulic working chambers A and B, bounded off from one another by piston 42, which is securely joined with piston rod 39, are defined in each hydraulic cylinder-piston unit 33, within the respective cylinder 35, which is closed at the top by a cover 41 with through-bore. These are supplied through piston rod 39 with through-bore. A valve unit 45 is built onto upper end 43 of piston rod 39 passing through through-bore 44 of cover 41—or possibly on an assembly plate (see below) joined to it. This respectively has four ports a, b, c, d; via two of these (ports a and b), it communicates with the pressure-supply unit, whereas the two other ports c and d communicate with supply ducts 46 and 47 extending within piston rod 39 and supplying the two working chambers A and B. The two switching valves 49 integrated in the respective valve unit 45 and actuatable via an electrical actuator 48 permit changeover between on the one hand fluidic communication of the two working chambers A and B with the pressure-supply unit (via respectively a passing connection of port a with port c and of port b with port d) and on the other hand a direct hydraulic short circuit of the two working chambers A and B via an internal bypass 50, via which ports c and d communicate fluidically with one another. In the said second switched position, the two working chambers A and B are shut off from the pressure-supply unit by means of switching valve 49.

The said bypasses 50 are opened when rapid positioning of the two ring structures 2 and 3 toward one another is taking place by means of a rapid positioning drive 51. This is electromechanically constructed and comprises a drive unit 52, four positioners 53 and one drive train 56 provided with drive unit 52 with shafts 54 and angle gear mechanisms 55 joining the four positioners 53. A hydraulic cylinder-piston unit 33—acting between cylinder 35 and piston rod 39—is associated with each of the four positioners 53 (constructed as rack-and-pinion units 57). For this purpose, a toothed gear, which is mounted rotatably in a toothed pinion housing 59, is engaged with a toothed rack 58 fixed on the cover 41 of the respectively associated hydraulic cylinder-piston unit 33. This toothed-pinion housing 59 is built onto an assembly plate 60, which in turn is securely joined with the end portion, projecting from cover 41, of piston rod 39 of the hydraulic cylinder-piston unit 33 in question. Four displacement-measuring systems 61, having respectively one ruler 62 fixed on cover 41 of the associated hydraulic cylinder-piston unit 33 and one transducer 63 fixed on the assembly plate 60 in question are provided functionally in parallel with the four positioners 53.

Drive unit 52, which is likewise joined (at least indirectly) in positionally invariable relationship to piston rod 39 of the hydraulic cylinder-piston unit 33, in question and in particular is built onto valve unit 45 associated with this, comprises a servo motor 64 with a flange-connected, self-locking planetary gear mechanism 65, an electromechanical separating clutch 66, an input 67 used for manual actuation and a distributing gear mechanism 68 with two outputs 69, to which associated shafts 54 of drive train 56 are connected.

The unit consisting of upper ring structure 3 and the eight cylinders 35, joined thereto, of hydraulic cylinder-piston units 33, is braced at least in the scope of a substantial part of its mass via spring elements 70 on lower ring structure 2. For this purpose, gas struts 71 extend between respectively a lower link point 72 associated with lower ring structure 2 and an upper link point 73 associated with cover 41 of a hydraulic cylinder-piston unit 33.

As regards the fixation, on base jaws 16, of the pressing jaws 17 that can be attached exchangeably to base jaws 16, hydraulically actuatable interlocks, which permit automated fitting of the eight base jaws 16 with a set of pressing jaws, are provided for the purpose-respectively protected by a panel 74 in ready-to-operate condition of radial press 1. The interlocks comprise respectively one clamping unit 76, which is attached to base body 75 of the base jaw and has a pivotably driven claw, which pulls the respective pressing jaw 17—bearing on reinforcing rail 77 of base body 75 of the base jaw-radially outward to its interlocking position defined by stops 78. Furthermore, the interlock respectively comprises, disposed in pairs on base body 75 of the base jaw, two hydraulic cylinders 79 having, attached to the respective piston rod, interlocking heads 80, which press the pressing jaw 17 in question into the associated seat of base body 75 of the base jaw. A mechanical spring 81 then supports respectively the hydraulic cylinder 79 in question and ensures that the pressing jaw 17 in question is also held without external energy on the respective base jaw 16, i.e. does not tilt due to its own weight. The position of interlocking heads 80 is detected by means of sensors 82, which are attached via angle pieces 83 to base body 75 of the base jaw.

What is claimed is:

1. A radial press (1) with a first and a second ring structure (2; 3) extending around a press axis (X) and, disposed between them around the press axis (X), several pressing elements (8) braced in a displaceable manner at bracing faces (11; 12) associated with the ring structures (2; 3), wherein an axial distance of the two ring structures (2; 3) from one another is variable by means of a hydraulic drive system, which comprises a multiplicity of hydraulic cylinder-piston units (33) oriented parallel to the press axis (X) and disposed in a distributed manner around the press axis (X), of which respectively cylinders (35) are coupled with the first ring structure and piston rods (39) are coupled with the second ring structure, and wherein furthermore at least the bracing faces (11; 12) associated with one of the two ring structures (2; 3) are oriented at an inclination to the press axis (X), wherein the radial press comprises an electromechanical rapid positioning drive (51) comprising several positioners (53) acting functionally in parallel with one another and coordinated with one another.

2. The radial press of claim 1, wherein the cylinder-piston units (33) are constructed as synchronous cylinders (34).

3. The radial press of claim 2, wherein a valve unit (45), permitting a direct hydraulic short circuit of the two working chambers (A, B) of one of the synchronous cylinders (34), is associated with each synchronous cylinder (34).

4. The radial press of claim 3, wherein the valve units (45) are disposed respectively at an end of the associated piston rod (39), which is provided with supply ducts (46, 47).

5. The radial press of claim 1, wherein the rapid positioning drive (51) comprises a common servo motor (64) acting on all positioners (53).

6. The radial press of claim 1, wherein the rapid positioning drive (51) comprises a self-locking gear mechanism.

7. The radial press of claim 1, wherein a separating clutch (66) is provided in a drive train (56) of the rapid positioning drive (51).

8. The radial press of claim 1, wherein a drive train (56) of the rapid positioning drive (51) is provided with an input (67) used for manual actuation.

9. The radial press of claim 1, wherein the positioners (53) act respectively between the cylinder (35) and the piston rod (39) of the corresponding hydraulic cylinder-piston unit (33).

10. The radial press of claim 1, wherein the pressing elements (8) comprise base jaws (16), and pressing jaws (17) that are fastened exchangeably to the base jaws, wherein an extent of the base jaws (16) parallel to the press axis (X) is at least twice as large as transversely relative thereto and/or a hydraulically actuatable interlocking system acts between the base jaws (16) and the pressing jaws (17).

11. The radial press of claim 1, wherein only the bracing faces (11) associated with one of the two ring structures (2; 3) are inclined relative to the press axis (X), whereas the bracing faces (12) associated with the other ring structure are oriented perpendicular to the press axis (X).

12. The radial press of claim 11, wherein one of the ring structures having the bracing faces oriented perpendicular to the press axis is constructed as a stationary ring structure.

13. The radial press of claim 12, wherein a displacement-measuring device with a radially oriented measuring direction acts between the stationary ring structure and at least one of the pressing elements, wherein the displacement-measuring device detects radial displacement of at least one of the pressing elements with respect to the stationary ring structure.

14. The radial press of claim 1, wherein the press axis (X) is vertically oriented, wherein one of the ring structures forms a lower ring structure (2) and the other ring structure forms an upper ring structure (3).

15. The radial press of claim 14, wherein the lower ring structure (2) is braced via a load-bearing structure (4) on a foundation but is spaced apart from the foundation.

16. The radial press of claim 15, wherein the upper ring structure is braced on the lower ring structure, at least a substantial part of the upper ring structure's own mass as well as parts of the hydraulic cylinder-piston units associated with the upper ring structure via spring elements which are constructed as gas springs and which act between the lower ring structure and the parts of the hydraulic cylinder-piston units associated with the upper ring structure.

17. The radial press of claim 1, wherein the pressing elements (8) are guided relative to the two ring structures (2; 3), and wherein such guiding is forced guidance.

18. The radial press of claim 17 wherein the forced guidance takes place via the pressing elements and pairs of guide slots associated with the ring structure and constructed on the pressing elements and guide elements engaging the guide slots, wherein the guide elements comprise guide rollers each mounted on a corresponding bolt.

* * * * *